Patented Dec. 5, 1944

2,364,382

UNITED STATES PATENT OFFICE 2,364,382

RUBBERLIKE PRODUCTS AND PREPARATION THEREOF

Arnold J. Morway, Roselle, N. J., assignor, by mesne assignments, to Jasco, Incorporated, a corporation of Louisiana No Drawing. Application December 24, 1936, Serial No. 117,634

10 Claims. (Cl. 252—48)

This invention relates to novel rubberlike products and methods of preparing them. More particularly, it relates to the preparation of sulphurized derivatives of high molecular weight polymers of iso-olefines such as isobutylene.

It has recently been discovered that plastic or elastic hydrocarbon products, the chemical structure of which may be represented as being an extremely long chain of carbon atoms with a number of short side chains of alkyl groups and hydrogen atoms, the entire product being substantially saturated with respect to hydrogen, can be made by polymerization of iso-olefines, particularly isobutylene, in the presence of an active volatile halide catalyst, such as boron fluoride, at low temperature, i. e. below —10° C. and preferably as low as —50° C. or even —80° C. or lower, using a solvent or diluent such as liquefied propane or ethylene, etc. Such polymers can be made having a molecular weight ranging from 1,000 or 3,000 up to an intermediate range of 10,000 or 25,000 or up to a very high range such as 200,000 or 300,000 or more.

Although these polymers are substantially saturated and are extremely resistant to oxidation and attack by common chemical reagents, such as sulfuric acid, caustic soda, etc., it has now been discovered, greatly contrary to expectation, that these polymers can be sulfurized or vulcanized to a certain extent.

Broadly, according to the present invention, this high molecular weight hydrocarbon polymer either alone or with a solvent for the polymer is treated with sulphur monochloride ($S_2Cl_2$) or sulphur dichloride ($SCl_2$) and heated to effect reaction.

Accelerators such as litharge, zinc oxide, organic amines, etc. may be beneficially used to accelerate the action of the polymer and the chloride of sulphur.

The products made according to the above process are somewhat rubber-like in texture and have greater elasticity and tensile strength than the original hydrocarbon polymer before the sulphurizing treatment. The products are also very resistant to various chemical agents such as acid, alkalies, oxidizing agents, etc.

This product may be used in various ways, such as oxidation inhibitors, Sligh dispersers and pour depressants in lubricating oils due to its solubility in lubricating oils and its sulphur content. It may also be used as an extreme pressure blending agent for increasing the load-carrying capacity of a lubricating oil in which it is blended.

The following example is given for the sake of illustration and without intention of limiting the invention thereto:

10 grams of an isobutylene polymer having an average molecular weight of about 55,000 was dissolved in 54 solvent naphtha and the solution was reacted in an autoclave with 0.5 gram of $S_2Cl_2$ at about 100° C. (210° F.) for 4 hours. Upon evaporation of the naphtha, a dry elastic product was obtained which had substantially greater elasticity and elongation than the original isobutylene polymer.

It is not intended that this invention be limited to any of the specific examples given nor to any theory as to the mechanism of the operation of the invention but only by the appended claims in which it is intended to claim all novelty inherent in the invention as broadly as the prior art permits.

I claim:

1. A synthetic rubber-like product derived by treatment with a chloride of sulfur of a polymerized isobutylene having a molecular weight above about 1,000.

2. A synthetic rubber-like product derived by treatment with a chloride of sulfur of an aliphatic polymerized isoolefine hydrocarbon resin having a high molecular weight.

3. A lubricant comprising a lubricating oil and a sulfurized isobutylene polymer, said isobutylene polymer having a molecular weight above about 1,000.

4. An extreme pressure lubricant comprising a lubricating oil and a sulfurized high molecular weight product of the low temperature polymerization of an isomono-olefin added in amounts sufficient to impart to said lubricating oil extreme pressure properties, said high molecular weight product having a molecular weight above about 1,000.

5. A lubricating oil composition comprising a lubricating oil blended with a product formed by treating polymerized isobutylene of high molecular weight with sulfur chloride, said product being added to impart extreme pressure characteristics to the lubricating oil composition.

6. A lubricating composition comprising a lubricating oil and a sulfur chloride treated hydrocarbon polymer of a molecular weight in excess of 1,000, said polymer comprising a polymerized low molecular weight iso-olefinic hydrocarbon.

7. A lubricant comprising a lubricating oil and a sulfurized isobutylene resin.

8. An extreme pressure lubricant comprising a lubricating oil and a sulfurized isobutylene resin added in amounts sufficient to impart to said lubricating oil extreme pressure properties.

9. A lubricant comprising a lubricating oil and a sulfurized iso-mono-olefin poylmer.

10. An extreme pressure lubricant comprising a lubricating oil and a sulfurized iso-mono-olefin polymer added in amounts sufficient to impart to said lubricating oil extreme pressure properties.

ARNOLD J. MORWAY.

Disclaimer 2,364,382.—*Arnold J. Morway*, Roselle, N. J. RUBBER-LIKE PRODUCTS AND PREPARATION THEREOF. Patent dated Dec. 5, 1944. Disclaimer filed Aug. 1, 1951, by the assignee, *Jasco, Incorporated*.

Hereby enters this disclaimer to claims 3, 4, 5, 6, 7, 8, 9, and 10 of said patent.

[*Official Gazette September 4, 1951.*]